United States Patent [19]

Matrozza et al.

[11] Patent Number: 4,790,994
[45] Date of Patent: Dec. 13, 1988

[54] METHOD FOR INHIBITING PSYCHROTROPHIC BACTERIA IN CREAM OR MILK BASED PRODUCTS USING A PEDIOCOCCUS

[75] Inventors: Mark A. Matrozza, Sarasota; Marianne F. Leverone, Bradenton; Donald P. Boudreaux, Sarasota, all of Fla.

[73] Assignee: Microlife Technics, Inc., Sarasota, Fla.

[21] Appl. No.: 103,883

[22] Filed: Oct. 2, 1987

[51] Int. Cl.$^4$ ........................ A23C 9/12; A23C 19/076
[52] U.S. Cl. .......................................... 426/38; 426/42; 426/43; 426/61; 426/36
[58] Field of Search ...................... 426/34, 36, 38, 42, 426/43, 61, 582

[56] References Cited

U.S. PATENT DOCUMENTS

| | | |
|---|---|---|
| 3,968,256 | 7/1976 | Sing . |
| 3,975,545 | 8/1976 | Vedamuthu . |
| 4,172,899 | 10/1979 | Vedamuthu ........................ 426/43 |
| 4,191,782 | 3/1980 | Vedamuthu . |
| 4,318,928 | 3/1982 | Sing ........................................ 426/38 |
| 4,477,471 | 10/1984 | Gonzalez . |
| 4,599,313 | 7/1986 | Gonzalez ............................. 426/38 |

OTHER PUBLICATIONS

Franklin et al., The Incidence of Bacteria in Cheese Milk and Cheddar Cheese and their Association with Flavour, J. Dairy Res (1963), 30, 87 pp. 87–99.
Graham et al., Appl. and Envir. Microbiol. 50; 532–534 (1985).
Gilliland et al., J. Dairy Science 66; 974–980 (1983).
Gilliland et al., Am. Public Health Assoc., M. L. Speck, ed. 172–178 (1976).

*Primary Examiner*—Marianne Cintins
*Attorney, Agent, or Firm*—Ian C. McLeod

[57] ABSTRACT

A method for inhibiting psychrotrophic bacteria in milk products such as Cottage cheese, particularly cream dressed Cottage cheese, using a Pediococcus is disclosed. The inhibition is produced by antimicrobial metabolites generated in the food without fermentation by live Pediococcus.

14 Claims, No Drawings

METHOD FOR INHIBITING PSYCHROTROPHIC BACTERIA IN CREAM OR MILK BASED PRODUCTS USING A PEDIOCOCCUS

BACKGROUND OF THE INVENTION

(1) Summary of the Invention

The present invention relates to a method for inhibiting psychrotrophic bacteria in finished cream or milk based products using a Pediococcus, preferably *Pediococcus pentosaceus*. In particular, the present invention relates to a method wherein the Pediococcus generates antimicrobic metabolites, particularly hydrogen peroxide, in Cottage cheese and other cream or milk based products at refrigeration temperatures used for storage.

(2) Prior Art

The use of *Streptococcus lactis* subspecies *diacetylactis* in Cottage cheese to inhibit psychrotrophic bacteria is described in U.S. Pat. No. 3,968,256 to Sing; U.S. Pat. Nos. 3,975,545 and 4,191,782 to Vedamuthu, and U.S. Pat. No. 4,477,471 to Gonzalez. This bacterial species produces an inhibitory substance in the Cottage cheese and other finished cream or milk based products which inhibits psychrotrophic bacteria. This species works well; however, there is a need for longer term inhibition of the psychrotrophic bacteria than is produced by the inhibitory substance produced by *Streptococcus lactis* subspecies *diacetylactis*.

Pediococci are used in meat and vegetable fermentations, and the like. Pediococci have not been used to any significant extent in the fermentation of milk based products since they are not as effective in this application because they do not grow well in milk. It is known that some Pediococci generate inhibitory substances called "bacteriocins" which inhibit other bacteria as discussed in Graham et al Appl. and Envir. Microbiol. 50, 532–534 (1985) which might be useful in fermented foods; however, where the food is not fermented by the Pediococci the bacteriocin would not be expected to be produced in significant amounts. There has been no suggestion by the prior art of the use of Pediococci in finished Cottage cheese or other cream or milk based products without fermentation for any purpose.

OBJECTS

It is therefore an object of the present invention to provide a method wherein a Pediococcus, particularly *Pediococcus pentosaceus*, is provided in finished Cottage cheese or other finished cream or milk based products without fermentation to produce improved inhibition of psychrotrophic bacteria. Further it is an object of the present invention to provide a method which is simple and economical to perform. These and other objects will become increasingly apparent by reference to the following description.

GENERAL DESCRIPTION

The present invention relates to a method for inhibiting the growth of psychrotrophic bacteria in a milk or cream based product which comprises: inoculating the milk or cream based product with a count of cells of a Pediococcus which produces antimicrobial metabolites sufficient to inhibit the growth of the psychrotrophic bacteria without fermentation; and storing the milk or cream based product during which time the antimicrobial metabolites are produced and the psychrotrophic bacteria are inhibited without a significant increase in the cell count of the Pediococcus. The antimicrobial metabolite is primarily hydrogen peroxide.

In particular, the present invention further relates to a method for inhibiting the growth of psychrotrophic bacteria in Cottage cheese which comprises: inoculating the Cottage cheese with a count of cells of a Pediococcus which produces antimicrobial metabolites sufficient to inhibit the growth of the psychrotrophic bacteria without fermentation; and storing the Cottage cheese during which time the antimicrobial metabolites are produced and the psychrotrophic bacteria are inhibited without an increase in the cell count of Pediococcus. In particular the Pediococcus is provided in cream dressing for the Cottage cheese.

Finally, the present invention relates to a bacterial composition which comprises cells of: a lactic acid producing bacterium which generates a diacetyl flavor at refrigeration temperatures in a milk or cream based product without fermentation and a Pediococcus which generates antimicrobial metabolites in the milk or cream based product at refrigeration temperatures, wherein the ratio of diacetyl producing bacteria to Pediococcus is between about 1 and 10 and 10 to 1 by cell count.

Preferably the Pediococcus is *Pediococcus pentosaceus*. The preferred *Pediococcus pentosaceus* strain which produces antimicrobial metabolites is *Pediococcus pentosaceus* NRRL-B-18229 which has been deposited with the National Regional Research Laboratory in Peoria, Ill. This strain is available upon request by name and number. Other strains of Pediococcus which produce hydrogen peroxide in the product can be used. Hydrogen peroxide production can be detected by the method described in Gilliland and Ewell, J. Dairy Science 66:974–980 (1983).

To assay for hydrogen peroxide production, the culture was diluted to a cell concentration of $1 \times 10^{10}$ CFU/ml in water. One microliter of this diluted culture ($1 \times 10^7$ CFU) was spotted on hydrogen peroxide indicator plates. The plates consisted of 8.5% non-fat dry milk and 1.5% agar. The medium was sterilized and cooled to 45° C. To the tempered medium, 0.67 ml of a filter sterilized peroxidase solution (Sigma Chemical Co. 40 U/ml) and 1.0 ml of a filter sterilized 0.274% solution of 2-2'-azinobis(3-ethylbenzothiozoline-6-sulfonic acid), diammonium salt (ABTS; Aldrich Chemical Co.) was added. Spotted plates were incubated at 23° C. and 8° C. for 18 hours. The presence of hydrogen peroxide was indicated by a blue zone the diameter of which was proportional to the amount of hydrogen peroxide produced.

The Pediococcus can be provided as a bacterial concentrate which is frozen or lyophilized. Concentrates usually contain between about $10^9$ and $10^{12}$ CFU per ml or gram. The cultures can be used directly from a growth medium and usually contain between $10^8$ to $10^{10}$ cells per ml.

The Pediococcus can be used at a rate of between about $10^4$ to $10^9$ CFU per gram of Cottage cheese or other cream or milk based product. In creams, such as cream dressing for Cottage cheese or the like, the amount is preferably between about $10^5$ to $10^8$ CFU per ml.

Milk or cream based products into which the Pediococcus is inoculated are cream fillings for desserts, salad dressings, cream dressings for Cottage cheese and other food products, sour cream and the like. The spoilage problems with these products are well known to those skilled in the art.

The milk or cream based product is stored at reduced temperatures from room temperatures. Generally this temperature is at refrigeration temperatures which are less than about 10° C. The milk or cream based product is not fermented during storage. The cells do not divide (grow) significantly and thus do not ferment the milk or cream based product after introduction. Thus the cell count of the Pediococcus does not increase significantly (i.e. by more than about ten times).

The milk or cream based product, particularly the cream dressing, can also contain *Streptococcus lactis* subspecies *diacetylactis* to develop a diacetyl flavor and an inhibitory substance as is known in the prior art. *Streptococcus lactis* subspecies *diacetylactis* ATCC 15346 is preferred. A *Leuconostoc* can also be used to develop a diacetyl flavor in the milk or cream based product. Preferably they are used at a cell count between about $10^5$ and $10^8$ cells per ml or gram of the product.

SPECIFIC DESCRIPTION

The following examples show the results with Cottage cheese dressings. Equivalent results are achieved with other milk or cream based products.

EXAMPLE 1

Procedure

Cottage cheese dressing was prepared using 200 ml of ultra-pasteurized half and half. Sodium chloride was added at 1.5% by weight and the dressing acidified to pH 5.0 using 85% by weight lactic acid.

The Cottage cheese dressing was inoculated from a frozen stock of psychrotrophic milk spoilage organisms obtained from commercial pasteurized milk. The initial psychrotrophic bacteria cell count of the dressing was $1.12 \times 10^4$ CFU/ml as determined using Crystal Violet Tetrazolium Agar as described by Gilliland et al (Psychrotrophic Microorganisms in *Compendium of Methods for the Microbiological Examination of Foods*, American Public Health Association, Marvin L. Speck, ed. 172–178 (1976)). This represents heavy contamination of the dressing.

The cream dressing was divided into $2 \times 100$ ml portions in sterile bottles. One bottle served as the control, and the other bottle was inoculated from a previously grown, concentrated, and frozen stock of *Pediococcus pentosaceus* NRRL-B-18229 which was thawed and used to deliver $8.9 \times 10^6$ CFU/ml of Cottage cheese dressing.

The bottles were held at 5° C. and monitored for psychrotrophic bacteria count approximately every 7 days using Crystal Violet Tetrazolium Agar. The results are shown in Table 1.

Results

TABLE 1

| Days @ 5° C. | CVT CFU/ml Cottage Cheese Dressing | |
|---|---|---|
| | Control | NRRL-B-18229 |
| 0 | $1.1 \times 10^4$ | $1.1 \times 10^4$ |
| 7 | $1.5 \times 10^4$ | $5.8 \times 10^3$ |
| 14 | $2.3 \times 10^5$ | $1.8 \times 10^3$ |
| 25 | $3.8 \times 10^8$ | <1000 |
| 41 | $3.2 \times 10^8$ | <1000 |

As can be seen from Table 1 there is not only an inhibition but a significant reduction of psychrotrophic bacteria using the *Pediococcus pentosaceus*. *Streptococcus lactis* subspecies *diacetylactis* is generally effective only for about 28 days. Example 1 is thus much better than the prior art.

EXAMPLE 2

Procedure

A Cottage cheese dressing agar medium was prepared using 500ml of ultra-pasteurized half and half. Sodium chloride and bacteriological agar were added at 1.5% each, and the medium was heated to boiling to dissolve the agar. After tempering to 45° C., the medium was acidified to pH 5.0 by adding 1.8 ml 85% lactic acid. The agar medium provides a convenient method of testing the inhibition of psychrotrophic bacteria in cream dressings.

The Cottage cheese dressing agar was then divided into $3 \times 100$ ml portions in sterile flasks and inoculated with the following cultures:

(A) Control—no culture
(B) *Pediococcus pentosaceus* (NRRL-B-18229) @$8.9 \times 10^6$ cells/ml.
(C) *Streptococcus lactis* subspecies *diacetylactis* (ATCC 15346) at $5 \times 10^6$ cells/ml. (As previously indicated, this culture and inoculation is preferred by the prior art for Cottage cheese cream dressing).

The flasks were mixed well and two (2) petri plates poured per flask and allowed to solidify. All plates were surface inoculated with 0.1 ml of a dilution prepared from a frozed stock of psychrotropic milk spoilage microorganisms obtained from commercial pasteurized milk. The psychrotropic microorganisms were diluted to deliver approximately 1500 cells per plate. This represents a very high level of contamination in Cottage cheese.

One set of plates was incubated at 24° C. as shown in Table 2 and the duplicate set was incubated at 5° C. as shown in Table 3. The temperature of 24° C. is just below room temperature, which can happen if there is temperature abuse, and 5° C. is a rerfrigeration temperature. The plates were monitored dialy for surface growth of the psychrotrophic microorganisms.

Results

TABLE 2

| | Degree of Psychrotroph Growth[1] | | |
|---|---|---|---|
| Days at 24° C. | Control A | *P. pentosaceus*[2] B | *S. lactis*[3] C |
| 2 | 2+ | 0+ | 0+ |
| 4 | 4+ | 0+ | 1+ |
| 8 | 4+ | 0+ | 1+ |
| 10 | 4+ | 0+ | 1+ |
| 16 | 4+ | 0+ | 1+ |
| 36 | 4+ | 0+ | 1+ |

[1]Psychrotroph growth visually scored from 0+ (no growth) to 4+ (confluent lawn).
[2]*P. pentosaceus* (NRRL-B-18229) at $8.9 \times 10^6$ CFU/ml.
[3]*S. lactis* subspecies *diacetylactis* (ATCC 15346) at $5 \times 10^6$ CFU/ml.

TABLE 3

| | Degree of psychrotroph Growth[1] | | |
|---|---|---|---|
| Days @ 5° C. | Uninoc. Control A | *P. pentosaceus*[2] B | *S. lactis*[3] C |
| 4 | 0+ | 0+ | 0+ |
| 8 | 3+ | 0+ | 2+ |
| 10 | 3+ | 0+ | 3+ |
| 16 | 3+ | 0+ | 4+ |

TABLE 3-continued

| Days @ 5° C. | Degree of psychrotroph Growth[1] | | |
|---|---|---|---|
| | Uninoc. Control A | P. pentosaceus[2] B | S. lactis[3] C |
| 36 | 3+ | 0+ | 4+ |

[1]Psychrotroph growth visually scored from 0+ (no growth) to 4+ (confluent lawn).
[2]P. pentosaceus (NRRL-B-18229) at $8.9 \times 10^6$ CFU/ml.
[3]S. lactis subspecies diacetylactis (ATCC 15346) at $5 \times 10^6$ CFU/ml.

Tables 2 and 3 show that Pediococcus pentosaceus NRRL-B-18229 is musc more effective than Streptococcus lactis subspecies diacetylactis ATCC 15346 against psychrotrophic microorganisms at 5° C. and 24° C.

Equivalent result are achieved with other milk or cream based unfermented products. It is very unexpected that Pediococci can achieve there results.

It is intended that the foregoing description be only illustrative and that the present invention be limited only by the hereinafter appended claims.

We claim:

1. A method for inhibiting the growth of psychrotrophic bacteria in a milk or cream based product which comprises:
   (a) inoculating the milk or cream based product with an effective count of cells of a Pediococcus which produces antimicrobial meabolited sufficient to inhibit the growth of the psychrotrophic bacteria without fermentation by the Pediococcus; and
   (b) storing the milk or cream based product at a temperature so that the antimicrobial metabolites are produced without fermentation of the product by the Pediococcus and the psychrotrophic bacteria are inhibited without a significant increase in the cell count of the Pediococcus.

2. The method of claim 1 wherein the Pediococcus is used in an amount between about $10^4$ and $10^9$ CFU per gram of the product.

3. The method of claim 1 wherein the product is a cream dressing.

4. The method of claim 1 wherein the Pediococcus is a Pediococcus pentosaceus which produces hydrogen peroxide in the product.

5. The method of claim 1 wherein the Pediococcus is Pediococcus pentosaceus NRRL-B-18229.

6. A method for inhibiting the growth of psychrotrophic bacteria in Cottage cheese which comprises:
   (a) inoculating the Cottage cheese with an effective count of cells of a Pediococcus which produces antimicrobial metabolites sufficient to inhibit the growth of the psychrotrophic bacteria without fermentation by the Pediococcus; and
   (b) storing the Cottage cheese at a temperature so that the antimicrobial metabolites are produced without fermentation of the Cottage cheese by the Pediococcus and the psychrotrophic bacteria are inhibited without a significant increase in the cell count of the Pediococcus.

7. The method of claim 6 wherein the Cottage cheese is provided with a cream dressing and wherein the Pediococcus is inoculated into the dressing in an amount between $10^5$ and $10^8$ CFU per ml of the dressing.

8. The method of claim 6 wherein the Cottage cheese is stored at a temperature of less than about 10° C.

9. The method of claim 6 wherein in addition Streptococcus lactis subspecies diacetylactis is inoculated into the Cottage cheese for diacetyl flavor development.

10. The method of claim 6 wherein a Leuconostoc is provided in the Cottage cheese with the Pediococcus to provide a diactyl flavor.

11. The method of claim 10 wherein the Leuconostoc is Leuconostoc cremoris.

12. The method of claim 11 wherein the Leuconostoc is inoculated into a cream dressing for the Cottage cheese.

13. The method of claim 11 wherein between about $10^5$ and $10^8$ cells per ml of the Leuconostoc are inoculated into the cream dressing.

14. The method of claim 6 wherein the Pediococcus is a Pediococcus pentosaceus which generates hydrogen peroxide in the product.

* * * * *

UNITED STATES PATENT AND TRADEMARK OFFICE
CERTIFICATE OF CORRECTION

PATENT NO. : 4,790,994
DATED : December 13, 1988
INVENTOR(S) : Mark A. Matrozza, Marianne F. Leverone and Donald P. Boudreaux It is certified that error appears in the above—identified patent and that said Letters Patent is hereby corrected as shown below:

Column 4, line 24 "5 x 106" should be --5 x $10^6$--.

Column 4, line 30 "frozed" should be --frozen--.

Column 4, line 41 "dialy" should be --daily--.

Column 5, line 13 "musc" should be --much--.

Column 5, line 16 "result" should be --results--.

Column 5, line 29 "meabolited" should be --metabolites--.

Column 6, line 31 "diactyl" should be --diacetyl--.

Signed and Sealed this

Twenty-third Day of May, 1989

Attest:

DONALD J. QUIGG

Attesting Officer

Commissioner of Patents and Trademarks